United States Patent [19]
McClean et al.

[11] Patent Number: 5,477,115
[45] Date of Patent: Dec. 19, 1995

[54] APPARATUS AND METHOD FOR CONTROLLING START-UP OF ELECTRICALLY-POWERED MACHINES

[75] Inventors: Christopher W. McClean, Cheshire, United Kingdom; Alvin J. Fisher, Murray, Ky.

[73] Assignee: Ingersoll-Rand Company, Woodcliff Lake, N.J.

[21] Appl. No.: 249,828

[22] Filed: May 26, 1994

[51] Int. Cl.⁶ .................................................. H02P 5/40
[52] U.S. Cl. ........................... 318/461; 318/778; 318/771
[58] Field of Search ................................. 318/430–469, 318/720–730, 798, 809, 770–773, 778, 779; 307/9–11; 290/38 R, 38 A, 38 B, 38 C, 38 D; 123/179 R, 179 B; 62/89, 180, 186; 417/282, 27, 290, 295

[56] References Cited

U.S. PATENT DOCUMENTS

| | | | |
|---|---|---|---|
| 3,959,979 | 6/1976 | Kramer | 623/89 |
| 4,384,243 | 5/1983 | Muskovac | 318/729 |
| 4,412,137 | 10/1983 | Hansen et al. | 307/10 R |
| 4,425,539 | 1/1984 | Wills | 318/771 |
| 4,490,620 | 12/1984 | Hansen | 290/38 R |
| 4,634,951 | 1/1987 | Kampf et al. | 318/778 |
| 4,862,010 | 8/1989 | Yamamoto | 290/38 R |
| 4,901,689 | 2/1990 | Cummins et al. | 290/38 R |
| 4,901,690 | 2/1990 | Cummins et al. | 290/38 R |
| 4,947,100 | 8/1990 | Dhyanchand et al. | 290/38 R |
| 4,968,926 | 11/1990 | Dhyanchand | 290/38 R |
| 5,003,242 | 3/1991 | Liber | 318/778 |
| 5,068,559 | 11/1991 | Satake et al. | 310/112 |
| 5,087,824 | 2/1992 | Nelson | 290/1 A |
| 5,262,704 | 11/1993 | Farr | 318/434 |
| 5,341,644 | 8/1994 | Nelson | 60/627 |
| 5,387,859 | 2/1995 | Murugan et al. | 322/10 |

*Primary Examiner*—Paul Ip
*Attorney, Agent, or Firm*—Victor M. Genco, Jr.; Michael M. Gnibus

[57] ABSTRACT

An apparatus and method are provided for controlling a reduced voltage motor starter, which transitions from a reduced voltage configuration to a full voltage configuration, to start a large horsepower electric motor for driving a machine.

10 Claims, 2 Drawing Sheets

APPARATUS AND METHOD FOR CONTROLLING START-UP OF ELECTRICALLY-POWERED MACHINES

BACKGROUND OF THE INVENTION

This invention generally relates to electrically powered machines, and more particularly to a method for controlling a reduced voltage motor starter for starting electrically-powered machines, such as electrically powered rotary or centrifugal compressors, for example.

Compressors are often driven by an electrically powered prime mover, such as a three-phase electric motor. These electric motors include an electric system which may utilize various electromechanical methods of reduced voltage motor starting.

Generally, reduced voltage motor starters (reduced voltage controllers) are employed to reduce the magnitude of line current drawn at the starting of a large horsepower electric motor, to reduce the starting torque of the motor applied to the driven machine, or both. Consequently, reduced voltage controllers may reduce the stress a large horsepower electric motor places on an electrical system. For example, the starting of a large horsepower electric motor can cause a large voltage drop in the facility's electrical system, thus reducing the available torque for accelerating the compressor load. In this regard, if the torque required to accelerate the compressor load is limited, then the motor will take longer to come up to a steady state speed, which may permit a transient torque condition to occur at starter transition which may damage the compressor. These torque transient conditions or reverse torque transients are caused by the tendency of the three-phase motor to shift phases which produces a very large spike in the current, thereby producing an opposite torque when a connection contactor is closed. Therefore, high impact loadings and great strains are placed on a compressor drive system which may exceed gear design strengths, and which may even cause compressor drive couplings and drive gears to shear.

Several methods of reduced voltage motor starting are available for use with large horsepower electric motors, and each method exhibits different torque-current characteristics. For example, some reduced voltage controllers lower the starting current and torque by means of an impedance inserted in the start-up circuitry of the electric motor. This impedance is mainly in the form of reactance. Many times, autotransformers are used to accomplish this type of reduced voltage starting. Another common method used to reduce electric motor start-up requirements is accomplished by a wye-delta (star-delta) type reduced voltage controller, or a partial winding reduced voltage controller. Depending on the type of controller used, the electric motor will produce a different amount of torque on starting for a given value of current drawn from the line.

Typically, each of these reduced voltage starting techniques requires an end user to adjust a mechanical timer or timing relay to provide a predetermined delay for transitioning the electromechanical contactors from a start configuration to a run configuration. This timing relay often requires exact adjustment to match the acceleration time of the electric motor and the machine, e.g. a rotary or centrifugal compressor, to perform a proper transition of the electromechanical contactors. However, during compressor operation, the timing relay often becomes improperly adjusted, which may cause damage to the compressor or the electrical system. Additionally, in the case of a wye-delta starter, the starter change over is arranged to occur in a fixed time regardless of actual motor speed. Accordingly, because torque transients can occur if the motor is not operating at a predetermined speed, fixed starter change over times may actually cause damage to the driven machine.

The foregoing illustrates limitations known to exist in present reduced voltage controllers. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method for controlling a reduced voltage motor starter, which transitions from a reduced voltage configuration to a full voltage configuration, to start a large horsepower electric motor for driving a machine. The method comprises initiating a machine start-up by providing an electric signal to the reduced voltage motor starter; initiating a timer which is operable to time out after a predetermined period of time; determining a shaft speed of a predetermined output shaft of the machine; comparing the shaft speed to a predetermined set point speed; aborting the machine start-up if the timer has timed out before the shaft speed equals the set point speed; and if the shaft speed is at least equal to the predetermined set point speed before the timer has timed out, transitioning the reduced voltage motor starter from the reduced voltage configuration to the full voltage configuration.

In another aspect of the present invention an apparatus is provided for controlling the start-up of a three-phase, electrically powered machine having at least one output shaft. The apparatus includes an electric motor operably connected to the machine for driving the output shaft. An electronic controller controls operation of the machine. A reduced voltage motor starter is connected to the electric motor and the electronic controller. Operation of the reduced voltage motor starter is controlled by the electronic controller. A means is provided for determining the speed of the output shaft and for providing an output signal to the electronic controller which corresponds to the output shaft speed. A timer, which is disposed in communication with the electronic controller, measures a predetermined period of time. An electronic memory, which communicates with the electronic controller, stores a predetermined logic routine which governs the electronic controller's control functions.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 2:
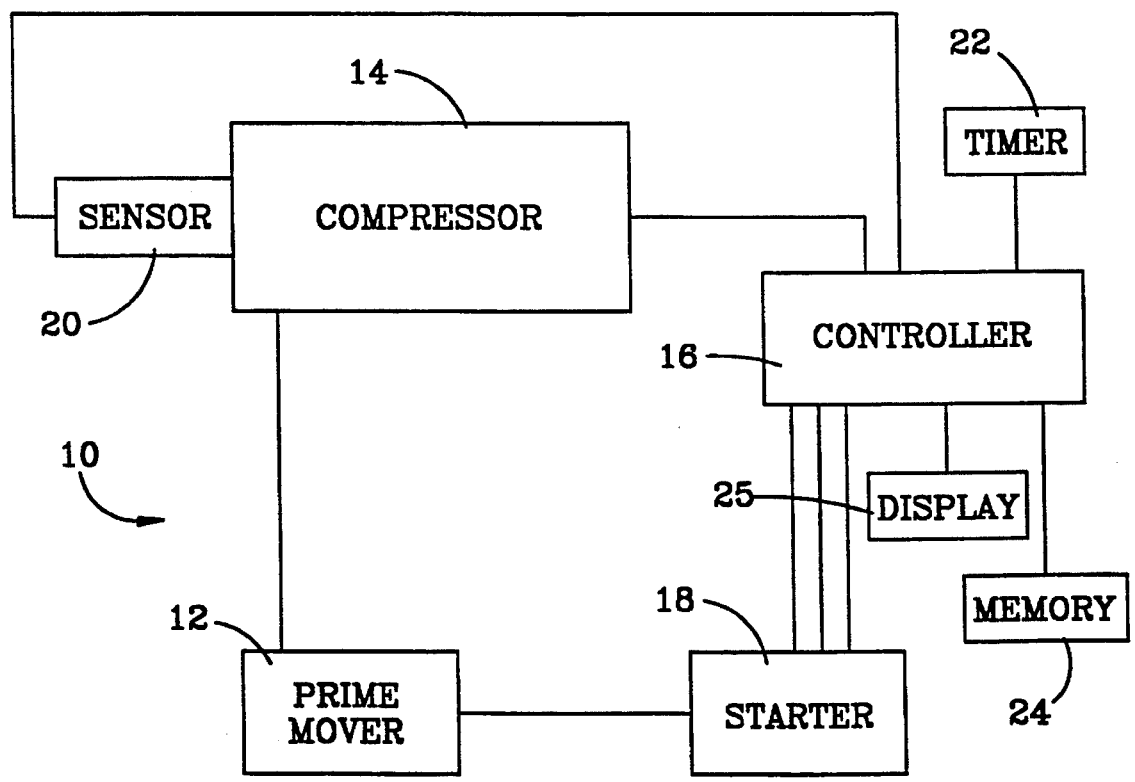
FIG. 2 is a block diagram of the apparatus of the present invention.

Referring now to the drawings, wherein similar reference characters designate corresponding parts throughout the several views, a block diagram of the apparatus 10 for implementing the present invention is illustrated in FIG. 2. As illustrated therein, a prime mover 12, such as a three phase electric motor, is operably connected to a machine 14, such a conventional rotary or centrifugal compressor, for example. An electronic controller 16 controls operation of the machine 14. A reduced voltage motor starter 18 is connected to the prime mover 12 and the electronic controller 16. A sensor 20 is operable to determine the speed of an output shaft of the compressor 14, and to provide an output signal to the electronic controller which corresponds to the output shaft speed. A timer 22, an electronic memory 24, and a display 25 communicate with the electronic controller 16.

In the preferred embodiment, the reduced voltage motor starter 18 is a wye-delta type reduced voltage motor starter. However, it is contemplated that other type reduced voltage motor starters may be employed in accordance with the teachings herein, such as autotransformer type reduced voltage motor starters and part-winding type reduced voltage motor starters, for example. The prime mover 12, which is a three phase, large horsepower electric motor, includes stator windings (not shown) which are not connected internally, and which are suitable for starting in wye connection with the reduced voltage motor starter and for running in delta connection therewith. As may be appreciated by one skilled in the art, depending on the type of reduced voltage motor starter used, the prime mover 12 will produce a different amount of torque on starting for a given value of current drawn.

The electronic controller 16 may be a microprocessor based electronic controller or microcontroller which is disposed in communication with the timer 22 and the memory 24. The electronic controller 16 controls operation of the compressor 14 and the reduced voltage motor starter 18. The electronic controller 16 is operable to process input signals and to compare these input signals to predetermined set point data so as to determine control functions for both the compressor 14 and the reduced voltage motor starter 18. In accordance with the teachings of the present invention, the electronic controller controls the reduced voltage motor starter 18, which transitions from a reduced voltage configuration to a full voltage configuration, to start the three-phase, large horsepower electric motor 12 for driving the compressor 14. More particularly the electronic controller 16 controls the action of the starter contactors of the reduced voltage motor starter (i.e. opening and closing in sequence) and monitors the starter contactors for any abnormal operation (i.e. dropping out of sequence transition.) The electronic controller 16 performs this control function in accordance with a predetermined logic routine which is described in detail hereinafter, and which may be stored in the memory 24.

Figure 1:
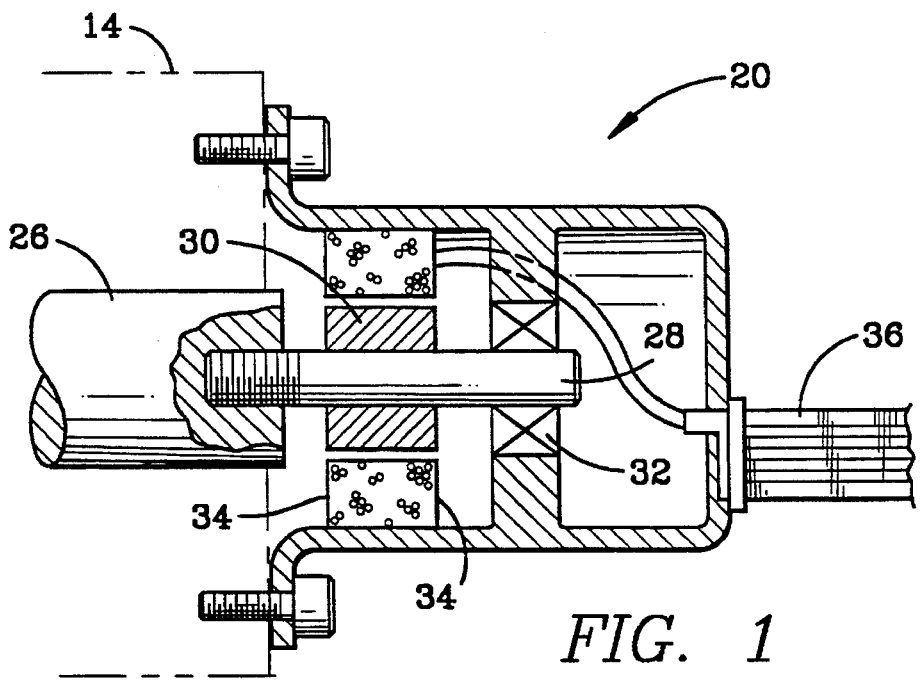
FIG. 1 is a partial, sectional view of a speed determining means in accordance with the teachings of the present invention.

Referring now to FIG. 1, an output shaft 26 of the compressor 14 is operatively connected to the speed sensor 20. Speed sensor 20 is an electronic feedback assembly which is operable to provide to the controller a predetermined electronic pulse or electronic signal which is proportioned and scaled to represent output shaft speed. For example 0 to 5 volts may represent 0 to 5000 RPM. The speed sensor 20 provides the electronic pulse or signal to the controller for processing. The sensor 20 may be a tachometer, zero speed switch, or any other equivalent speed sensing apparatus. The speed sensor which is illustrated in FIG. 1 includes a shaft 28 which is coupled to the output shaft 26. Shaft 28 is surrounded by magnets 30 and is mounted in a bearing 32. Windings 34 surround the magnets 30, and winding outputs 36 are connected to the windings to transmit an output signal from the speed sensor 20 to the electronic controller 16. It will be appreciated that, as shown, the teachings of the present invention may be quite easily incorporated and retrofitted into existing equipment. Additionally, it is contemplated that the speed sensor 20 may be alternatively operably connected to an output shaft (not shown) of the prime mover 12.

The memory 24 stores a predetermined logic routine which governs the electronic controller in its control of the reduced voltage motor starter 18. This predetermined logic routine is summarized in FIG. 3 and explained in further detail hereinafter.

Figure 3:
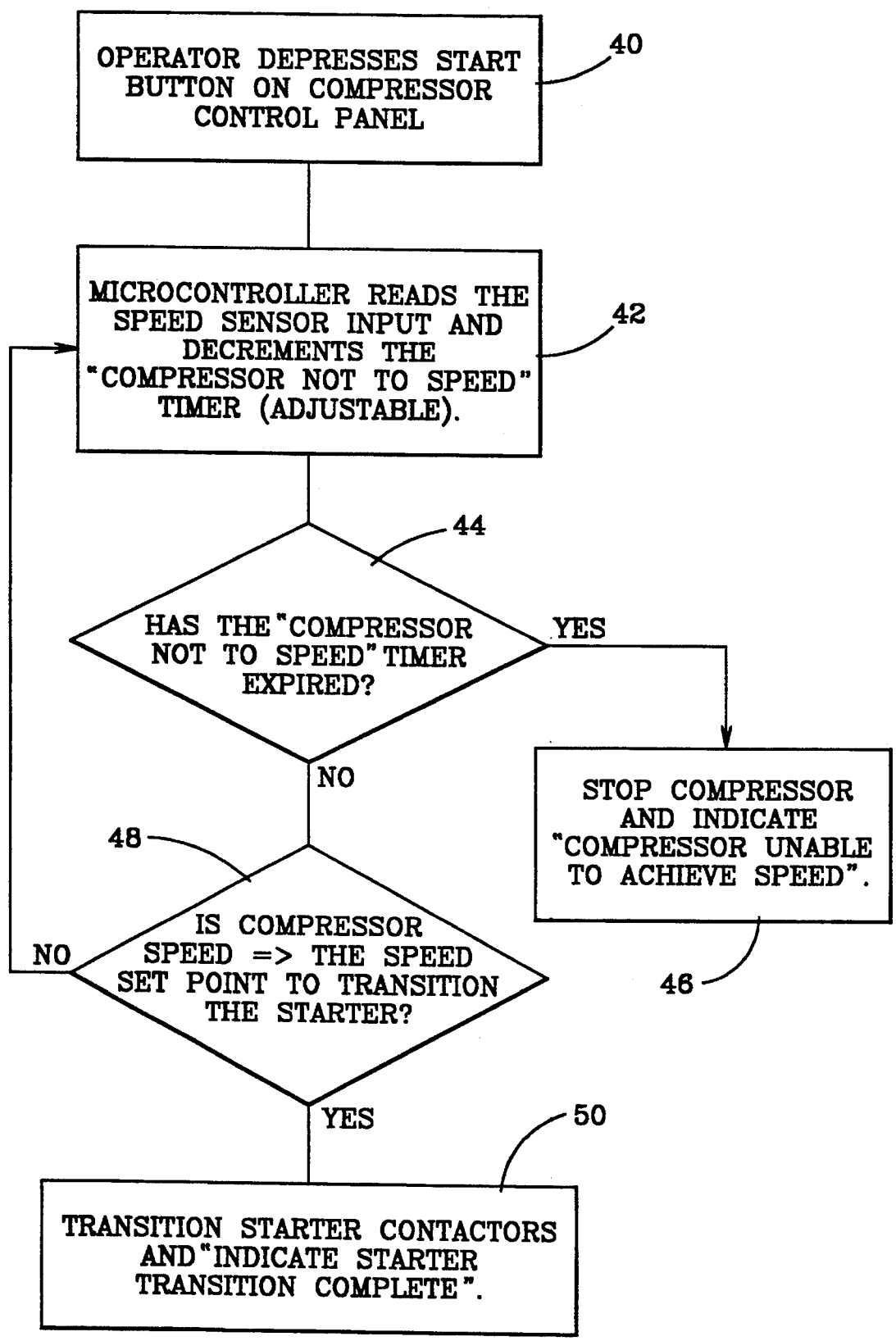
FIG. 3 is a flow chart of a predetermined logic routine in accordance with the teachings of the present invention.

In operation, and referring to FIG. 3, the present invention controls a reduced voltage motor starter to start a large horsepower, three-phase electric motor for driving a machine, such as the compressor 14. Initially, a user selects a predetermined set point speed and enters this set point speed into the controller 16. The set point speed represents the rotational speed of the output shaft 26 at which the starter contactors of the reduced voltage motor starter will transition. At step 40 of FIG. 3, an end user initiates a machine start-up by providing an electronic signal to the wye-delta reduced voltage motor starter which is disposed in an initial wye configuration. Thereafter, the timer 22 (Compressor Not to Speed Timer) is initiated and is decremented at predetermined intervals. The timer 22 is adjustable to time out at a predetermined user selected period of time. As the electric motor 12 begins to rotate the output shaft 26, the speed sensor 20 provides an output signal to the controller 16 for processing into output shaft speed data. At step 48, the processing includes comparing the output shaft speed data to the set point speed.

At step 44, the controller determines whether the timer 22 has timed out. If the predetermined time interval has expired before the shaft speed equals the set point speed, at step 46, the controller 16 aborts the start-up, and provides a signal to the display 25 indicating that the compressor 14 is unable to achieve set point speed. If the predetermined time interval has not expired, the calculated instantaneous output shaft speed is compared to the predetermined set point speed. If the output shaft speed is equal to or greater than the set point speed, at step 50, the reduced voltage motor starter is transitioned from the wye configuration to a delta configuration, and the controller 16 provides a signal to the display 25 to indicate that the starter transition is complete. By utilizing the speed of the output shaft 26, a properly timed wye-delta transition can be executed.

While this invention has been illustrated and described in accordance with a preferred embodiment, it is recognized that variations and changes may be made therein without departing from the invention as set forth in the following claims.

Having described the invention, what is claimed is:

1. A method for controlling a reduced voltage motor starter, which transitions from a reduced voltage configuration to a full voltage configuration, to start a large horsepower electric motor for driving a machine, the method comprising the following steps:

initiating a machine start-up by providing an electronic signal to the reduced voltage motor starter;

initiating a timer which is operable to time out after a predetermined period of time;

determining a shaft speed of an output shaft of the machine;

comparing the shaft speed to a predetermined set point speed;

aborting the machine start-up if the timer has timed out before the shaft speed equals the predetermined set point speed; and if the shaft speed is at least equal to the predetermined set point speed before the timer has timed out, transitioning the reduced voltage motor starter from the reduced voltage configuration to the full voltage configuration.

2. A method for controlling a reduced voltage motor starter, as claimed in claim 1, further comprising the steps of:

providing an indicating means for indicating the occurrence of at least one predetermined event;

if the shaft speed is not at least equal to the predetermined set point speed upon the timer timing out, providing a signal to the indicating means for indicating that the output shaft is unable to achieve the predetermined set point speed; and if the shaft speed is at least equal to the predetermined set point speed before the timer has timed out, providing a signal to the indicating means, after the starter has transitioned from the reduced voltage configuration to the full voltage configuration, to indicate that the starter transition is complete.

3. A method for controlling a wye-delta type reduced voltage motor starter to start a large horsepower, three-phase electric motor for driving a machine, the method comprising the following steps:

initiating a machine start-up by providing an electronic signal to the wye-delta reduced voltage motor starter which is disposed in an initial wye configuration;

providing an indicating means for indicating the occurrence of at least one predetermined event;

initiating a timer which is operable to time out after a predetermined period of time;

determining a shaft speed of a predetermined output shaft of the machine;

comparing the shaft speed to a predetermined set point speed;

aborting the machine start-up if the timer has timed out before the shaft speed equals the predetermined set point speed;

providing a signal to the indicating means for indicating that the output shaft is unable to achieve the predetermined set point speed;

if the shaft speed is at least equal to the predetermined set point speed before the timer has timed out, transitioning the wye-delta reduced voltage motor starter from the wye configuration to a delta configuration; and providing a signal to the indicating means, after the starter has transitioned from the wye configuration to the delta configuration, to indicate that the starter transition is complete.

4. An apparatus for controlling the start-up of a large horsepower, electrically powered machine having at least one output shaft, the apparatus comprising:

an electric motor operably connected to the machine for driving the output shaft;

an electronic controller for controlling operation of the machine;

a reduced voltage motor starter connected to the electric motor and the electronic controller, and wherein operation of the reduced voltage motor starter is controlled by the electronic controller;

means for determining the speed of the output shaft and for providing an output signal to the electronic controller which corresponds to the output shaft speed;

a timer, which is disposed in communication with the electronic controller, for measuring a predetermined period of time; and an electronic memory which communicates with the electronic controller, the electronic memory storing a predetermined logic routine which:

initiates the timer to measure a predetermined period of time;

compares the shaft speed to a predetermined set point speed;

aborts a machine start-up if the predetermined period of time expires before the shaft speed equals the predetermined set point speed; and if the shaft speed is at least equal to the predetermined set point speed before the predetermined period of time expires, transitions the reduced voltage motor starter from the reduced voltage configuration to the full voltage configuration.

5. An apparatus, as claimed in claim 4, and wherein the electrically powered machine is a compressor.

6. An apparatus, as claimed in claim 4, and wherein the reduced voltage motor starter is a wye-delta type reduced voltage motor starter.

7. An apparatus, as claimed in claim 4, and wherein the means for determining the speed of the output shaft is an electronic feedback assembly which is operable to provide a predetermined electronic pulse which represents a predetermined output shaft speed.

8. An apparatus, as claimed in claim 4, and wherein the means for determining the speed of the output shaft is an electronic feedback assembly which is operable to provide a predetermined electronic signal which represents a predetermined output shaft speed.

9. An apparatus, as claimed in claim 4, and wherein the means for determining the speed of the output shaft is a tachometer.

10. An apparatus, as claimed in claim 4, and wherein the means for determining the speed of the output shaft is a zero speed switch.

* * * * *